June 5, 1945.   F. T. NEWELL   2,377,510
HINGED SELF SEALING COUPLING
Filed Sept. 26, 1942
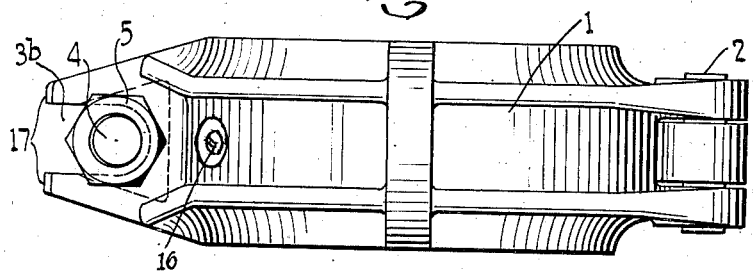
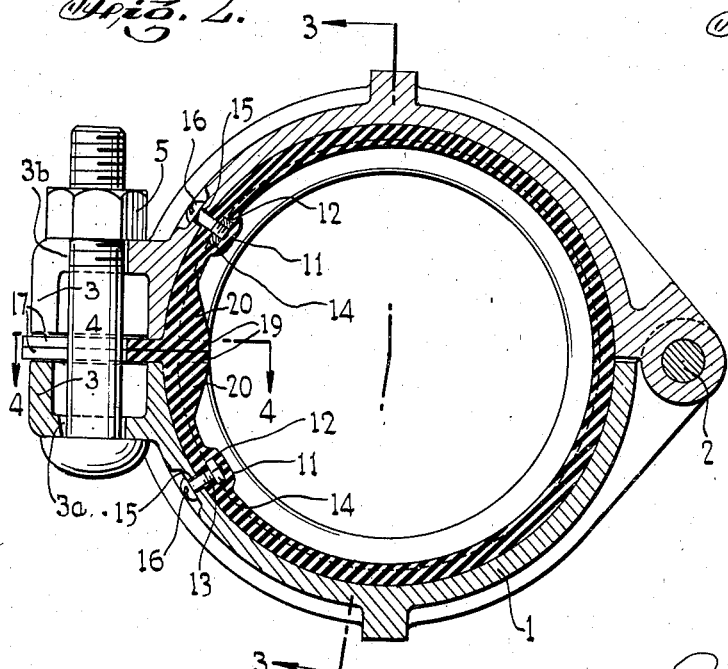
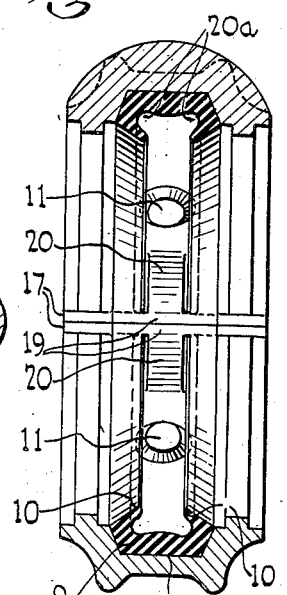
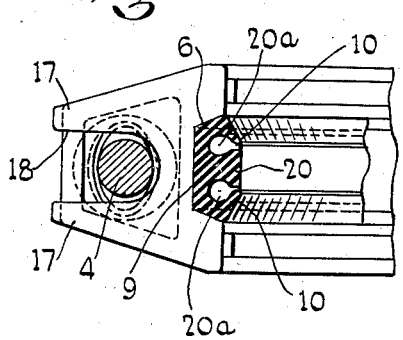
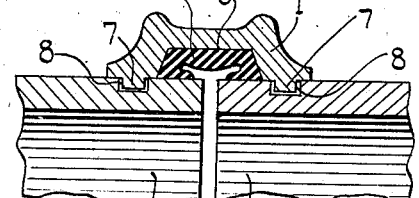
INVENTOR
Frederick T. Newell
BY
Louis Prevost Whitaker
ATTORNEY Patented June 5, 1945

2,377,510

UNITED STATES PATENT OFFICE 2,377,510

HINGED SELF-SEALING COUPLING

Frederick T. Newell, Bradford, Pa., assignor to Dresser Industries, Inc., a corporation of Pennsylvania Application September 26, 1942, Serial No. 459,743

5 Claims. (Cl. 285—129)

My invention consists in the novel features hereinafter described, reference being had to the accompanying drawing, which represents one form in which I have contemplated embodying my invention, and the said invention is fully disclosed in the following description and claims.

My invention consists in a hinged self-sealing coupling for pipes in which a metal housing formed of two parts surrounds and encloses a gasket of rubber or rubber composition, channel-shaped in cross section, and provided with inwardly extending lips engaging the meeting ends of the pipe members. The housing is provided with inwardly extending portions to engage grooves or shoulders on the pipes and prevent their endwise separation, and pressure tightness is obtained by the action of the pressure of the line contents which enters the annular cavity of the gasket and presses the lips thereof against the outer surfaces of the pipes and seals the joint. One object of my invention is to so construct the coupling that it can be fully assembled as a single unit, before it is applied to the pipes so as to insure the proper positioning of the gasket around the pipe ends and the housing around the gasket, and thus avoid any danger of rupturing or injuring the gasket, and insuring the perfect sealing of the joint.

Referring to the drawing,

Fig. 1 is a top plan view of the coupling.

Fig. 2 is a transverse sectional view of the same.

Fig. 3 is a section on line 3—3 of Fig. 2.

Fig. 4 is a section on line 4—4 of Fig. 2.

Fig. 5 is a partial section through a pipe joint formed with my coupling and illustrating the interlocking engagement of the housing.

In the drawing the housing, which is indicated at 1, is formed in two parts connected at one side, by a hinge 2, the opposite ends of the housing sections being provided with lugs 3 preferably made hollow tod ecrease the weight of the housing. One of the lugs 3 is provided with a bolt hole 3a to receive a coupling bolt 4 provided with a nut 5. The other lug is preferably provided with a bolt receiving recess 3b so that the bolt 4 may be carried by the lower lug 3 and may be swung into position with respect to the recessed lug when the coupling is placed around the meeting pipe ends. The housing is provided with an annular channel 6 to accommodate and fit the gasket 9 and at each side of the channel 6 the housing is provided with means to interlock with the adjacent pipe section, in this instance with an annular inwardly extending flange 7 to engage a groove 8 in the pipe section, as shown in Fig. 5, thus holding the meeting ends of the pipe members together. Any suitable form of interlocking means may be employed for this purpose within the scope of my invention.

The hollow gasket, which is preferably formed of rubber or rubber composition, or like deformable elastic material, is constructed in one piece, separated at one point, where its meeting ends come together. The gasket, indicated at 9, has its outer peripheral portions formed to fit the channel 6 of the housing, the walls of the channel portions of the gasket being provided with inwardly extending annular pipe engaging lips 10 adapted to be pressed sealingly against the outer surfaces of the pipes P and P' by the pressure of the fluid passing through the pipes, which comunicates with the interior of the gasket.

The gasket 9 is permanently connected with the housing by the means illustrated in Fig. 2. At each side of the meeting point of the ends of the gasket each end thereof is provided with a boss 11 molded in the channel portion of the gasket a short distance from the meeting point. These bosses are closed at their inner sides and are provided with recesses 12, having openings 13 extending to the outer surface of the gasket. The openings 13 are of sufficient size to permit nuts 14 to be forced through them into the recesses 12. The housing members are provided with apertures 15 in registration with the apertures 13, and screws 16 are inserted through the aligned apertures of housing and gasket and threaded into the nuts, thus securing the gasket to the housing in proper relation therewith without affording any path for leakage of pressure fluid.

In order to seal the gasket at its meeting ends, the said ends are provided with outwardly extending ears 17 which extend between the bosses 3, 3, and are recessed to accommodate the bolt 4, as indicated at 18. The ends of the gasket are also provided with inwardly extending ears or lips 19, each of which is provided with a buttress 20 formed by thickening the wall of the gasket at that point, preferably to an extent equal to the width of the adjacent ear 19. These buttresses reinforce the inner portions of the inwardly extending ears and insure that adequate precompression is applied to them when the housing bolt is tightened. Spaces 20a (see Fig. 4) are formed on either side of the buttresses so that the line pressure can act to maintain the seal of the annular lips 10, 10 of the gasket.

As shown in Fig. 2, the opposed inner faces of the housing lugs 3, 3, are spaced slightly from the outer surfaces of the outwardly extending ears 17, 17, so that when the housing bolt is tightened initial pressure of the bolt is exerted on the inwardly extending ears 18, 19 through the buttresses 20, 20 to insure complete sealing of the inner portion of the split before the lugs 3, 3 bind on the outwardly extending ears 17, 17 and force them into sealing engagement.

It will be understood that the parts of the coupling will be assembled ready for use, thereby assuring that the parts will be and remain in proper relation for immediate application to the meeting ends of pipes. It is only necessary to place the coupling around the pipes and tighten the nut 5 and a perfectly sealed coupling of the pipes is insured. In practice, the circumferential length of the gasket is slightly less than that of the outside of the pipe, so that when the coupling is bolted around the pipe the gasket is stretched around the pipe surface to provide an initial seal.

What I claim and desire to secure by Letters Patent is:

1. In a pipe coupling of the kind described, the combination with a circular channeled housing formed of two sections and having abutting portions, and means for uniting said sections, of a channeled gasket enclosed within said housing and having annular pipe engaging sealing lips on opposite sides of said channel, said gasket being severed at one point and having its meeting ends aligned with meeting ends of said housing sections, the meeting ends of said gasket having outwardly extending ears adapted to sealingly engage each other and to lie between the meeting faces of said housing sections, and inwardly extending lips in radial alignment with said outwardly extending ears and adapted to sealingly engage each other, said gasket being provided interiorly with buttresses to hold said inwardly extending ears in sealing engagement.

2. In a pipe coupling of the kind described, the combination with a circular channeled housing formed of two sections and having abutting portions, and means for uniting said sections, of a channeled gasket enclosed within said housing and having annular pipe engaging sealing lips on opposite sides of said channel, said gasket being severed at one point and having its meeting ends aligned with meeting ends of said housing sections, the meeting ends of said gasket having outwardly extending ears adapted to sealingly engage each other and to lie between the meeting faces of said housing sections, and inwardly extending lips in radial alignment with said outwardly extending ears and adapted to sealingly engage each other, said gasket being provided interiorly with buttresses to hold said inwardly extending lips in sealing engagement, and having recesses on opposite sides of said abutments to insure the sealing engagement of adjacent portions of said annular lips with an enclosed pipe, by the internal fluid pressure in the channel of the gasket.

3. In a pipe coupling of the kind described, the combination with a circular channeled housing formed of two sections, hinged together at one side and provided at the other side with clamping lugs and a clamping bolt, of a circular channeled gasket of elastic material adapted to engage the housing channel, and having sealing pipe engaging lips on opposite edges of the channel, said gasket being severed at one point and having its meeting ends provided with outwardly extending ears adapted to sealingly engage each other and to lie between the clamping lugs of the housing, and means for permanently securing the ends of said gasket to the corresponding portions of the housing sections, the ends of said gasket being provided with inwardly extending lips in radial alignment with the said outwardly extending ears, for sealingly engaging each other, said gasket having buttresses adjacent to the inwardly extending ears for holding them in initial sealing engagement.

4. In a pipe coupling of the kind described, the combination with a circular channeled housing formed of two sections and having abutting portions provided with means for interlocking with the pipe sections to be united, and means for uniting said sections, of a channeled gasket enclosed within said housing and having annular pipe engaging sealing lips on opposite sides of said channel, said gasket being severed at one point and having its meeting ends aligned with meeting ends of said housing sections, the meeting ends of said gasket having inwardly extending lips adapted to sealingly engage each other, and outwardly extending ears adapted to sealingly engage each other and to be clamped between the meeting faces of said housing sections to hold said inner lips in initial sealing contact.

5. In a pipe coupling of the kind described, the combination with a circular channeled housing formed of two sections, hinged together at one side and provided at the other side with clamping lugs and a clamping bolt, of a circular channeled gasket of elastic material adapted to engage the housing channel, and having an imperforate inner surface and opposed sealing pipe engaging lips on opposite edges of the channel, said gasket being severed at one point and having its meeting ends provided with inwardly extending lips for sealingly engaging each other, and means for permanently securing the ends of said gasket to the corresponding portions of the housing sections to press said inwardly extending lips together into initial sealing contact when the ends of the housing sections are drawn toward one another by said clamping bolt.

FREDERICK T. NEWELL.